(12) United States Patent
Sharp et al.

(10) Patent No.: US 7,706,987 B2
(45) Date of Patent: Apr. 27, 2010

(54) IN-FLOW DETERMINATION OF LEFT AND RIGHT EIGENVECTORS IN A CORIOLIS FLOWMETER

(75) Inventors: Thomas Dean Sharp, Terrace Park, OH (US); David Frederick Normen, Louisville, CO (US); Stuart J. Shelley, Cincinnati, OH (US)

(73) Assignee: Micro Motion, Inc., Boulder, CO (US)

( * ) Notice: Subject to any disclaimer, the term of this patent is extended or adjusted under 35 U.S.C. 154(b) by 211 days.

(21) Appl. No.: 11/574,716

(22) PCT Filed: Sep. 27, 2004

(86) PCT No.: PCT/US2004/031549

§ 371 (c)(1),
(2), (4) Date: Mar. 5, 2007

(87) PCT Pub. No.: WO2006/036139

PCT Pub. Date: Apr. 6, 2006

(65) Prior Publication Data
US 2008/0011100 A1    Jan. 17, 2008

(51) Int. Cl.
G01F 1/84    (2006.01)

(52) U.S. Cl. .............. 702/48; 702/45; 702/54; 73/861.355; 73/861.356; 73/861.357

(58) Field of Classification Search ........... 702/45, 702/189, 54, 48; 73/861.355–861.357
See application file for complete search history.

(56) References Cited

U.S. PATENT DOCUMENTS

| | | | |
|---|---|---|---|
| 4,365,154 A * | 12/1982 | Arnold et al. | 376/165 |
| RE31,450 E | 11/1983 | Smith | |
| 4,491,025 A | 1/1985 | Smith et al. | |
| 5,734,112 A | 3/1998 | Bose et al. | |
| 5,969,265 A | 10/1999 | Van Cleve et al. | |
| 5,987,999 A | 11/1999 | Van Cleve et al. | |
| 6,092,429 A | 7/2000 | Cunningham et al. | |
| 6,199,022 B1 | 3/2001 | Cunningham | |
| 6,233,526 B1 | 5/2001 | Cunningham | |
| 6,272,438 B1 | 8/2001 | Cunningham et al. | |
| 6,347,293 B1 | 2/2002 | Cunningham et al. | |
| 6,360,175 B1 | 3/2002 | Cunningham et al. | |
| 6,427,127 B1 | 7/2002 | Cunningham | |
| 6,466,880 B2 * | 10/2002 | Cunningham et al. | 702/50 |
| 6,577,977 B2 | 6/2003 | Normen | |
| 6,606,573 B2 | 8/2003 | Wheeler | |

(Continued)

FOREIGN PATENT DOCUMENTS

JP    07139986    6/1995

(Continued)

*Primary Examiner*—Drew A Dunn
*Assistant Examiner*—Hien X Vo
(74) *Attorney, Agent, or Firm*—The Ollila Law Group LLC

(57) ABSTRACT

A method and apparatus for periodically calculating the relative phase of the left eigenvector for a vibrating conduit is provided. During normal operation, two drivers are used in tandem to excite the main bending mode of the conduit (202). Periodically, first one (204), then the second (206), of the two drivers is disabled, allowing measurements that enable the determination of the relative phase of the left eigenvector (208) for the vibrating conduit.

25 Claims, 5 Drawing Sheets

U.S. PATENT DOCUMENTS 6,704,666 B2* 3/2004 Normen .................. 702/45
6,763,730 B1* 7/2004 Wray .................. 73/861.356

FOREIGN PATENT DOCUMENTS

RU           2182696 C2    5/2002
RU           2231027 C2    6/2004
WO           WO95/16897    6/1995

* cited by examiner

IN-FLOW DETERMINATION OF LEFT AND RIGHT EIGENVECTORS IN A CORIOLIS FLOWMETER

BACKGROUND OF THE INVENTION

1. Field of the Invention

The invention is related to the field of flow meters, and in particular, to Coriolis flow meters.

2. Description of the Prior Art

Mass flow rate is measured in a Coriolis flow meter by vibrating a fluid-carrying tube(s) in a sinusoidal motion and measuring the time delay (or phase angle) between the vibration response at two or more locations on the tube(s). For practical situations the time delay varies linearly with mass flow rate, however, the time delay is generally not zero at zero mass flow. There is usually a zero-flow delay or offset caused by a number of factors such as non-proportional damping, residual flexibility response, electromagnetic crosstalk, or phase delay in instrument electronics.

This zero-flow offset is typically corrected for by measuring the zero-flow offset at the zero-flow condition and subtracting the measured offset from subsequent measurements made during flow. This would be sufficient to correct for the zero-flow offset problem if the zero-flow offset remained constant. Unfortunately, the zero-flow offset can be affected by small changes in the ambient environment (such as temperature) or to changes in the piping system through which the material is flowing. The changes in the zero-flow offset will cause errors in the measured flow rates. During normal operations, there may be long periods of time between no-flow conditions. The Coriolis flow meter can be calibrated by zeroing the meter only during these no-flow conditions. The changes in the zero-offset over time may cause significant errors in the measured flow.

Therefore there is a need for a system and method for calibrating the zero-flow offset during flow.

SUMMARY OF THE INVENTION

A method and apparatus is disclosed that enables the periodic calculation of the relative phase of the left eigenvector for a vibrating conduit. During normal operation, two drivers are used in tandem to excite the main bending mode of the conduit. Periodically, first one, then the second, of the two drivers is disabled, allowing measurements that enable the determination of the relative phase of the left eigenvector for the vibrating conduit.

Aspects

One aspect of the invention includes, a method, comprising:

flowing a material through a conduit while exciting a vibration mode of the conduit;

measuring the relative motion of the vibrating conduit;

periodically determining a relative phase of a left eigenvector for the conduit.

Preferably, the method further comprises:

determining a relative phase of a right eigenvector for the conduit;

determining an actual flow of the material through the conduit using the relative phase of the left eigenvector and the relative phase of the right eigenvector.

Preferably, the method further comprises:

determining an uncorrected flow of the material through the conduit using the relative phase of the right eigenvector;

determining a zero offset for the flow of the material through the conduit by comparing the uncorrected flow with the actual flow.

Preferably, the method further comprises:

determining a material flow through the conduit using the relative phase of the right eigenvector corrected by the zero offset.

Preferably, the method further comprises:

determining the relative phase of a right eigenvector;

determining a zero offset for the flow of the material through the conduit by averaging the relative phase of the right eigenvector with the relative phase of the left eigenvector.

Preferably, the method further comprises:

determining a material flow through the conduit using the relative phase of the right eigenvector corrected by the zero offset.

Preferably, the method further comprises where the relative phase of the left eigenvector is corrected for a residual flexibility response and electromagnetic cross-talk.

Preferably, the method further comprises:

measuring a first relative phase between two spaced apart locations on the vibrating conduit while exciting the vibration mode of the conduit using both a first driver and a second driver, where the first driver is spaced apart from the second driver;

measuring a second relative phase between the two spaced apart locations on the vibrating conduit while exciting the vibration mode of the conduit using only the second driver;

calculating the residual flexibility response and electromagnetic cross-talk associated with the first driver by subtracting the second relative phase from the first relative phase;

measuring a third relative phase between the two spaced apart locations on the vibrating conduit while exciting the vibration mode of the conduit using only the second driver;

calculating the residual flexibility response and electromagnetic cross-talk associated with the second driver by subtracting the third relative phase from the first relative phase.

Another aspect of the invention comprises:

flowing a material through a conduit while exciting a vibration mode of the conduit using at least two drivers in a spaced apart configuration;

measuring the motion of the vibrating conduit;

determining a first positional relationship between a first location on the conduit and a first one of the drivers while driving the vibration mode of the conduit using only the first one of the drivers;

determining a second positional relationship between the first location on the conduit and a second one of the drivers while driving the vibration mode of the conduit using only the second one of the drivers;

determining a left eigenvector using the first positional relationship and the second positional relationship.

Preferably, the method further comprises where the motion of the conduit is measured with a first sensor that is co-located with the first driver and with a second sensor that is co-located with the second driver.

Preferably, the method further comprises:

determining a relative phase of a right eigenvector for the conduit while exciting the vibration mode of the conduit using both the first and second drivers;

determining an actual flow of the material through the conduit by subtracting the relative phase of the left eigenvector from the relative phase of the right eigenvector.

Preferably, the method further comprises:

determining an uncorrected flow of the material through the conduit using the relative phase of the right eigenvector;

determining a zero offset for the flow of the material through the conduit by comparing the uncorrected flow with the actual flow;

determining a material flow through the conduit using the relative phase of the right eigenvector corrected by the zero offset.

Preferably, the method further comprises:

determining the relative phase of a right eigenvector for the conduit while exciting the vibration mode of the conduit using both the first and second drivers;

determining a zero offset for the flow of the material through the conduit by averaging the relative phase of the right eigenvector with the relative phase of the left eigenvector;

determining a material flow through the conduit using the relative phase of the right eigenvector corrected by the zero offset.

Preferably, the method further comprises:

measuring a first delta time between the first location and a second location when driving the vibration mode using the at least two drivers;

measuring a second delta time between the first location and the second location when driving the vibration mode using all but the first one of the drivers;

measuring a third delta time between the first location and the second location when driving the vibration mode using all but the second one of the drivers;

calculating a first correction value using the first delta time and the second delta time;

calculating a second correction value using the first delta time and the third delta time;

adjusting the first positional relationship, using the first correction value, before calculating the left eigenvector; and, adjusting the second positional relationship, using the second correction value, before calculating the left eigenvector.

Preferably, a method further comprises:

flowing a material through a conduit while exciting a vibration mode of the conduit;

measuring the relative motion of the vibrating conduit;

measuring a relative phase of a right eigenvector while exciting the vibration mode of the conduit;

determining the material flow through the conduit using the relative phase of a right eigenvector corrected by a zero offset;

determining a new zero offset without stopping the material flow through the conduit;

determining the material flow through the conduit using the relative phase of a right eigenvector corrected by the new zero offset.

Preferably, the method further comprises where the new zero offset is determined using a relative phase of a left eigenvector for the conduit.

Preferably, the method further comprises where the new zero offset is determined periodically.

Preferably, the method further comprises where the periodicity is a function of the accuracy required in measuring the flow.

Preferably, the method further comprises where the new zero offset is determined when a change in a measured environmental parameter occurs.

Another aspect of the invention comprises:

a conduit configured to contain a material flowing through the conduit;

at least two drivers configured to excite a plurality of vibration modes of the conduit;

a sensing apparatus configured to measure the relative motion of the vibrating conduit;

a device configured to periodically determining a relative phase of a left eigenvector for the conduit using the relative motion of the vibrating conduit;

the device also configured to determines a relative phase of a right eigenvector for the conduit using the relative motion of the vibrating conduit.

Preferably, the method further comprises where an actual flow of the material through the conduit is determined by using the difference in the relative phase of the left eigenvector compared to the relative phase of the right eigenvector.

Preferably, the method further comprises where a flow of the material through the conduit is determined using the relative phase of the right eigenvector corrected with a zero offset.

Preferably, the method further comprises:

determining the zero offset for the flow of the material through the conduit by averaging the relative phase of the right eigenvector with the relative phase of the left eigenvector.

Preferably, the method further comprises where an actual flow of the material through the conduit is determined by subtracting the relative phase of the left eigenvector from the relative phase of the right eigenvector; and, the zero offset for the flow of the material through the conduit is determined by comparing the flow determined using the relative phase of the right eigenvector with the actual flow.

Preferably, the method further comprises where the relative phase of the left eigenvector is corrected for a residual flexibility response and electromagnetic cross-talk.

Preferably, the method further comprises where a first relative phase between a first location on the vibrating conduit and a second location on the vibrating conduit is determined while exciting the vibration mode of the conduit using the at least two drivers;

a second relative phase between the first location on the vibrating conduit and the second location on the vibrating conduit is determined while exciting the vibration mode of the conduit using all but a first of the at least two drivers;

a third relative phase between the first location on the vibrating conduit and the second location on the vibrating conduit is determined while exciting the vibration mode of the conduit using all but a second of the at least two drivers; and the residual flexibility response and electromagnetic cross-talk for the first of the at least two drivers is determined by subtracting the second relative phase from the first relative phase;

the residual flexibility response and electromagnetic cross-talk for the second of the at least two drivers is determined by subtracting the third relative phase from the first relative phase.

Preferably, the method further comprises where the sensing apparatus comprises at least two sensors in a spaced apart relationship.

Preferably, the method further comprises where the device is a processor running code that causes the determination of the relative phase of the left and right eigenvector.

Preferably, the method further comprises where the device is a circuit that causes the determination of the relative phase of the left and right eigenvector.

Preferably, the method further comprises:

a conduit configured to contain a material flowing through the conduit;

a means to excite a vibration mode of the conduit;

a means for sensing the relative motion of the vibrating conduit;

a means for periodically determining a relative phase of a left eigenvector for the conduit;

a means for determining a relative phase of a right eigenvector for the conduit;

a means for determining a zero offset for the material flowing through the conduit by averaging the relative phase of the right eigenvector with the relative phase of the left eigenvector;

a means for determining an actual material flow by using the relative phase of the right eigenvector corrected by the zero offset.

DETAILED DESCRIPTION OF THE PREFERRED EMBODIMENT

Figure 1A:
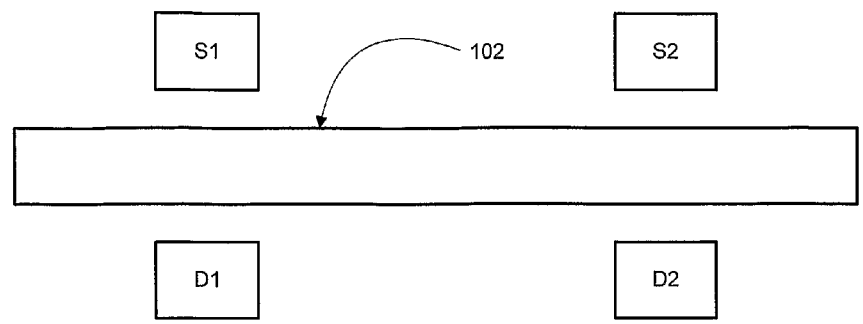
FIG. 1A is a top view of a conduit in an un-deflected position in an example embodiment of the invention.

FIGS. 1A, 1B, 1C, and 2-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Theoretical Background

The operation of Coriolis flow meters can be described using mathematical formulas. The general system of first order differential equations describing the motion of a linear system is:

$$\begin{bmatrix} C & M \\ M & 0 \end{bmatrix} \begin{Bmatrix} \dot{x} \\ \ddot{x} \end{Bmatrix} + \begin{bmatrix} K & 0 \\ 0 & -M \end{bmatrix} \begin{Bmatrix} x \\ \dot{x} \end{Bmatrix} = \begin{Bmatrix} f \\ 0 \end{Bmatrix} \quad (1)$$

In Equation (1) M and K are the mass and stiffness matrices of the system and C is a general damping matrix which may have a symmetric component due to damping and a skew symmetric component due to Coriolis force.

$$A\dot{q} + Bq = u \quad (2)$$

Equation 1 can be rewritten as equation 2 where A is equal to the matrix $$\begin{bmatrix} C & M \\ M & 0 \end{bmatrix}$$

and B is equal to the matrix $$\begin{bmatrix} K & 0 \\ 0 & -M \end{bmatrix}$$

and u is equal to $$\begin{Bmatrix} f \\ 0 \end{Bmatrix}.$$

Insight into the equation of motion can be gained by looking at equations 1 and 2. The generalized eigenvalue problem associated with Equation (2) may be solved for the right eigenvectors, $\phi^{(r)}$, such that:

$$B\phi^{(r)} = -A\phi^{(r)}\lambda \quad (3)$$

For symmetric A and B matrices, the eigenvector can be used to diagonalize, or decouple the equations of motion. Decoupled equations are readily solved. For a non-symmetric system, for example where C includes the Coriolis matrix, the right eigenvectors do not diagonalize the equations of motion, resulting in coupled equations. Coupled equations are more difficult to solve and hinder insight into the solution. Left eigenvectors are required to diagonalize non-symmetric A or B matrixes. The following derivations show the process. The left eigenvectors are obtained by solving the following generalized eigenvalue problem:

$$\phi^{(l)T}B = -\phi^{(l)T}A\lambda$$

$$B^T\phi^{(l)} = -A^T\phi^{(l)}\lambda \quad (4)$$

M and K would generally be symmetric for a Coriolis flow meter. For no flow C would also be symmetric, thus, the system matrices, A and B would be symmetric. In this case Equations (3) and (4) are identical and the left and right eigenvectors are the same. When there is flow the associated non-symmetry of the C matrix causes the left and right eigenvectors to be different.

Consider the j'th right eigenvector:

$$B\phi_j^{(r)} = -A\phi_j^{(r)}\lambda_j \quad (5)$$

and the i'th left eigenvector;

$$\phi_i^{(l)T}B = -\phi_i^{(l)T}A\lambda_i \quad (6)$$

Pre-multiplying Equation (5) by $\phi_i^{(l)T}$, and post multiplying Equation (6) by $\phi_j^{(r)}$ and subtracting the two yields:

$$0 = -\phi_i^{(l)T}A\phi_j^{(r)}(\lambda_j - \lambda_i)$$

$$\Rightarrow \phi_i^{(l)T}A\phi_j^{(r)} = 0 \text{ for } i \neq j \quad (7)$$

By multiplying Equation (5) by $1/\lambda_j$ and Equation (6) by $1/\lambda_i$ and going through the same procedure we can show:

$$\Rightarrow \phi_i^{(l)T} B \phi_j^{(r)} = 0 \text{ for } i \neq j \quad (8)$$

Equations (7) and (8) show that by pre and post multiplying either of the system matrices, A or B, by the matrix of left eigenvectors, $\Phi^{(L)}$, and the matrix of right eigenvectors, $\Phi^{(R)}$, respectively, the system matrices are diagonalized.

$$\Phi^{(L)T} A \Phi^{(R)} = \begin{bmatrix} \ddots & & \\ & M_A & \\ & & \ddots \end{bmatrix} \quad (9)$$

$$\Phi^{(L)T} B \Phi^{(R)} = \begin{bmatrix} \ddots & & \\ & M_B & \\ & & \ddots \end{bmatrix}$$

The fact that the left and right eigenvector matrices diagonalize the system matrices means that both the set of right eigenvectors and the set of left eigenvectors are linearly independent. Either set can be used as a basis of a coordinate system for the response. Recognizing that the difference between the left and right eigenvectors is due to the non-symmetric Coriolis matrix, forms the basis of this invention.

In terms of a mathematical model of the meter, the mass, stiffness and damping matrices which model non-Coriolis effects are symmetric. For a no-flow system the left and right eigenvectors are identical (within an arbitrary scale factor). The Coriolis force associated with flow, however, manifests itself in the mathematical model as a skew symmetric damping matrix (the transpose is the negative of the original matrix). The skew symmetric Coriolis matrix causes the left and right eigenvectors of the system to be different. For a flowing system with no non-proportional damping the relative phase between different coefficients of the left eigenvectors is equal and opposite to the relative phase between the same coefficients on the right eigenvectors. For a system with non-proportional damping theses phase values are offset equally for both the left and right eigenvectors, however, the difference remains the same. Thus, if the phase characteristics of the left and right eigenvectors can be measured accurately this characteristic allows the phase attributable to zero-offset from non-proportional damping and the phase attributable to material flow to be distinguished, eliminating associated zero-offset errors.

Residual flexibility, electromagnetic crosstalk and electronic measurement system characteristics also contribute to zero-offset. One interpretation of these effects is that they introduce error in the measurement of the right eigenvector phase. If the drive mode (right eigenvector) could be measured exactly, non-proportional damping would be the only effect causing zero offset and this error would be easily distinguished from flow effects using the left and right eigenvector dT information.

In Operation

FIG. 1A shows a top view of a conduit 102 configured to contain a material flowing through the conduit. D1 and D2 are two drivers (also called actuators) spaced along the conduit 102. In the preferred mode the two drivers are spaced symmetrically around the axial center of the conduit. The drivers are configured to impart a force to the conduit 102 to excite a plurality of vibration modes in the conduit 102. The force may be substantially coherent (e.g. confined to a narrow frequency) or may be broadband. The drivers can be such known means as a magnet, attached to the conduit, and a coil, attached to a reference, through which an oscillating current is passed.

S1 and S2 depict two sensors co-located with drivers D1 and D2. The sensors are configured to produce a plurality of signals representing the location and motion of the conduit 102. The sensors may include a variety of devices, such as coil-type velocity transducers, optical or ultrasonic motion sensors, accelerometers, inertial rate sensors and the like. In this embodiment there are two sensors shown with each sensor co-located with one of the drivers. In other embodiments there may only be one sensor configured to measure the position and motion of the conduit 102 along the length of the conduit 102. Other configurations having more than 2 sensors are also possible.

Figure 1B:
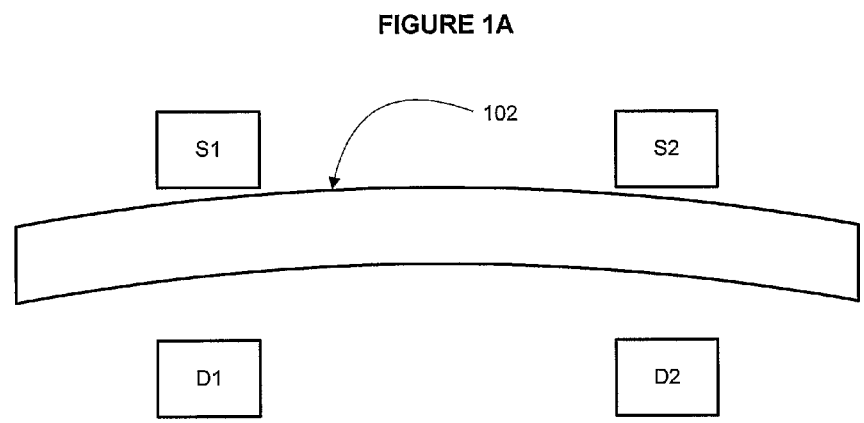
FIG. 1B is a top view of a conduit in a deflected position corresponding to the main bending mode in an example embodiment of the invention.
Figure 1C:
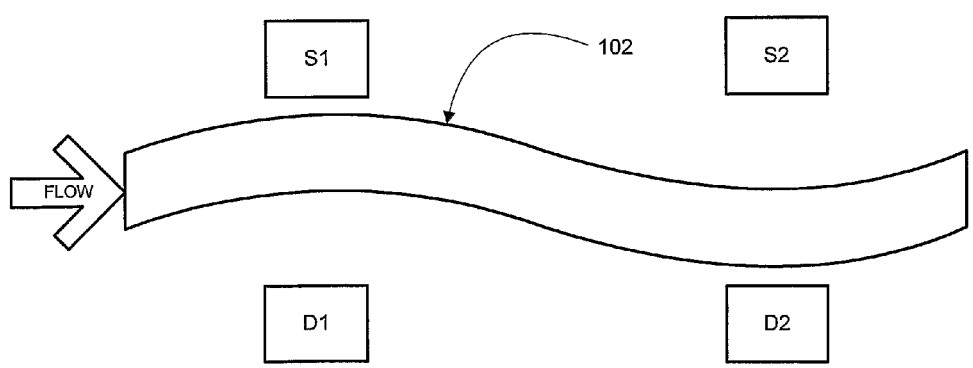
FIG. 1C is a top view of a conduit in a deflected position corresponding to a bending mode induced by Coriolis forces in an example embodiment of the invention.

FIG. 1A shows the conduit 102 in an un-deflected state. By driving the actuators with equal power, the main bending mode of the conduit can be excited. U.S. Pat. No. 6,092,429 granted Jul. 25, 2000 and entitled "Driver for oscillating a vibrating conduit", which is hereby included by reference, discloses drivers configured to excite different modes of vibration in a conduit. FIG. 1B shows the conduit 102 in a deflected state corresponding to the main bending mode of the conduit. This vibration mode also corresponds to a condition when there is no flow of material through the conduit. The deflection of the conduit 102 in FIG. 1B and 1C have been magnified for clarity. The actual deflections of conduit 102 would be much smaller. When material is flowing through the vibrating conduit 102, the flowing material causes Coriolis forces to be generated. The Coriolis forces deflect the conduit 102 and excite additional vibration modes. FIG. 1C shows the main vibration mode excited by the Coriolis forces. The relative phase difference detected between sensor S1 and sensor S2 can be used to determine the material flow through the conduit 102. In no-flow condition (as depicted in FIG. 1B) there is no phase difference due to flow, detected between S1 and S2. There may be phase differences due to zero-offset conditions. Once material is flowing through the conduit 102 there will be a phase difference between S1 and S2, due to flow. The measured phase difference detected between S1 and S2 is a measure of the relative phase of the right eigenvector of the system and is proportional to the material flow through the conduit. Let $\theta R$ equal the relative phase of the right eigenvector, $\theta S1$ be the measured phase of the vibration of the conduit at sensor S1, and S2 be the measured phase of the vibration of the conduit at sensor S2, then $\theta R = \theta S1 - \theta S2$. A time difference, delta T, can be calculated from the phase difference by dividing by the vibration frequency to $\omega$. $\Delta T = (\theta S1 - \theta S2)/\omega$ to. The time difference $\Delta T$ is also proportional to the material flow through the conduit and is the measurement typically used in the mass flow meters. A more accurate determination for the material flow through the conduit 102 can be calculated by correcting the measured material flow with a zero-offset amount $\Delta T_C = \Delta T - \text{Zero Offset}$.

In one example embodiment of the invention, during normal operations, both drivers are used to excite the main bending mode of the conduit. The material flow through the conduit is determined by measuring the relative phase of the right eigenvector, converting to a $\Delta T$ domain, and correcting this value with a zero-offset correction amount. $\Delta T_{RC} = \Delta T_R - \text{ZeroOffset}$. Periodically, the conduit is excited using only one, then the other driver. Measurements are taken between the phase of the driving signal and a position on the conduit. These measurements are used to determine the relative phase of the left eigenvector of the system.

Figure 2:
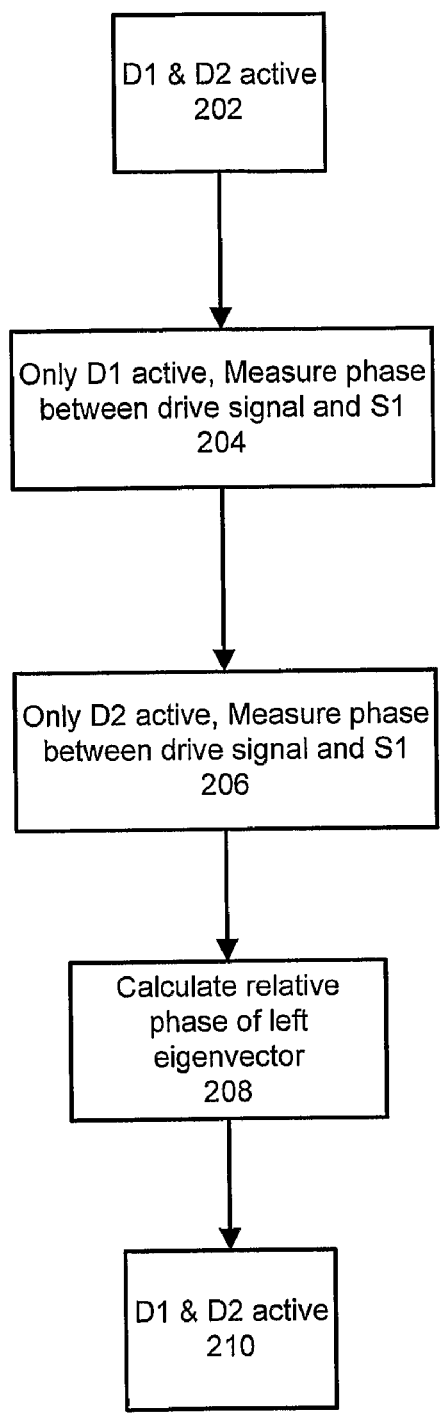
FIG. 2 is a flow chart for determining the left eigenvector in an example embodiment of the invention.

FIG. 2 is a flow chart for determining the left eigenvector in an example embodiment of the invention. At step 202, during normal operations, both drivers are used to excite the vibration of the conduit. At step 204, only driver D1 is used to excite the vibration of the conduit. During this time, the phase between the driving signal used by driver D1 and the sensor S1 are measured. Call this measured phase difference θ1. At step 206 driver D1 is inactivated and only driver D2 is used to excite the vibration of the conduit. During this time the phase between the diving signal used by driver D2 and sensor S1 is measured. Call this measured phase difference θ2. At step 208, the relative phase of the left eigenvector θL for the system may be calculated as θL=θ1−θ2. Converting to the time domain yields the relative delta T of the left eigenvector: $\Delta T_L=(θ1−θ2)/\omega$. At step 210 normal operation resumes, and both drivers are used to excite the vibration of the conduit. The sequence in which the drivers are switched on and off is not important.

Figure 3:
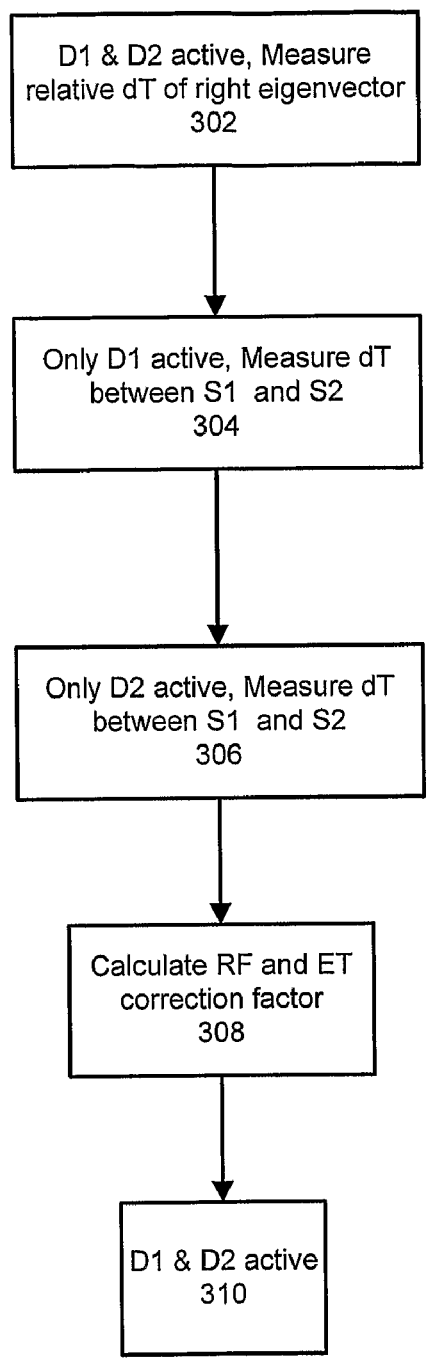
FIG. 3 is a flow chart for determining the residual flexibility and electronic crosstalk in an example embodiment of the invention.

Because the relative phases (θ1 and θ2) for the left eigenvector are determined when exciting the vibration of the conduit with only one driver, the residual flexibility response (RF) and electromagnetic crosstalk (EC) must be corrected. Each driver causes some residual flexibility response and electromagnetic crosstalk. This effect decays to zero almost instantaneously when the driver is shut off. By briefly shutting off a driver, the change in the measured phase at each sensor caused by the residual flexibility response and electromagnetic crosstalk associated with that driver can be determined. The change in the measured phase can be determined by measuring the step change in the difference between the sensors that occurs when each driver is inactivated. FIG. 3 is a flow chart showing one embodiment for determining the residual flexibility and electronic crosstalk.

In step 302, during normal operations, both drivers are used to excite the vibration of the conduit. The delta T with both drivers operating, $\Delta T_{D1D2}$, is measured between sensor S1 and sensor S2. At step 304, driver D2 is shut off and only driver D1 is used to excite the conduit. During this time the delta T with only driver D1 operating, $\Delta T_{D1}$, is measured between sensor S1 and sensor S2. The difference between $\Delta T_{D1D2}$ and $\Delta T_{D1}$ is due to the residual flexibility and electronic crosstalk from driver D2. At step 306, driver D1 is shut off and only driver D2 is used to excite the conduit. During this time the delta T with only driver D2 operating, $\Delta TD_2$, is measured between sensor S1 and sensor S2. The difference between $\Delta T_{D1D2}$ and $\Delta TD_2$ is due to the residual flexibility and electronic crosstalk from driver D1. To correct a measured $\Delta T$ for the residual flexibility and electronic crosstalk from both drivers, the difference between $\Delta T_{D1D2}$ and $\Delta T_{D1}$ and the difference between $\Delta T_{D1D2}$ and $\Delta T_{D2}$ is subtracted from the measured $\Delta T$. Therefore delta T corrected is $\Delta T_C=\Delta T-(\Delta T_{D1D2}-\Delta T_{D1})-(\Delta T_{D1D2}-\Delta T_{D2})$. Using this technique, the delta T for the relative phase of the left eigenvector $\Delta T_{LC}$ can be corrected for the residual flexibility and electronic crosstalk. $\Delta T_{LC}=\Delta T_L-(\Delta T_{D2}-\Delta T_{D1})$.

Figure 4:
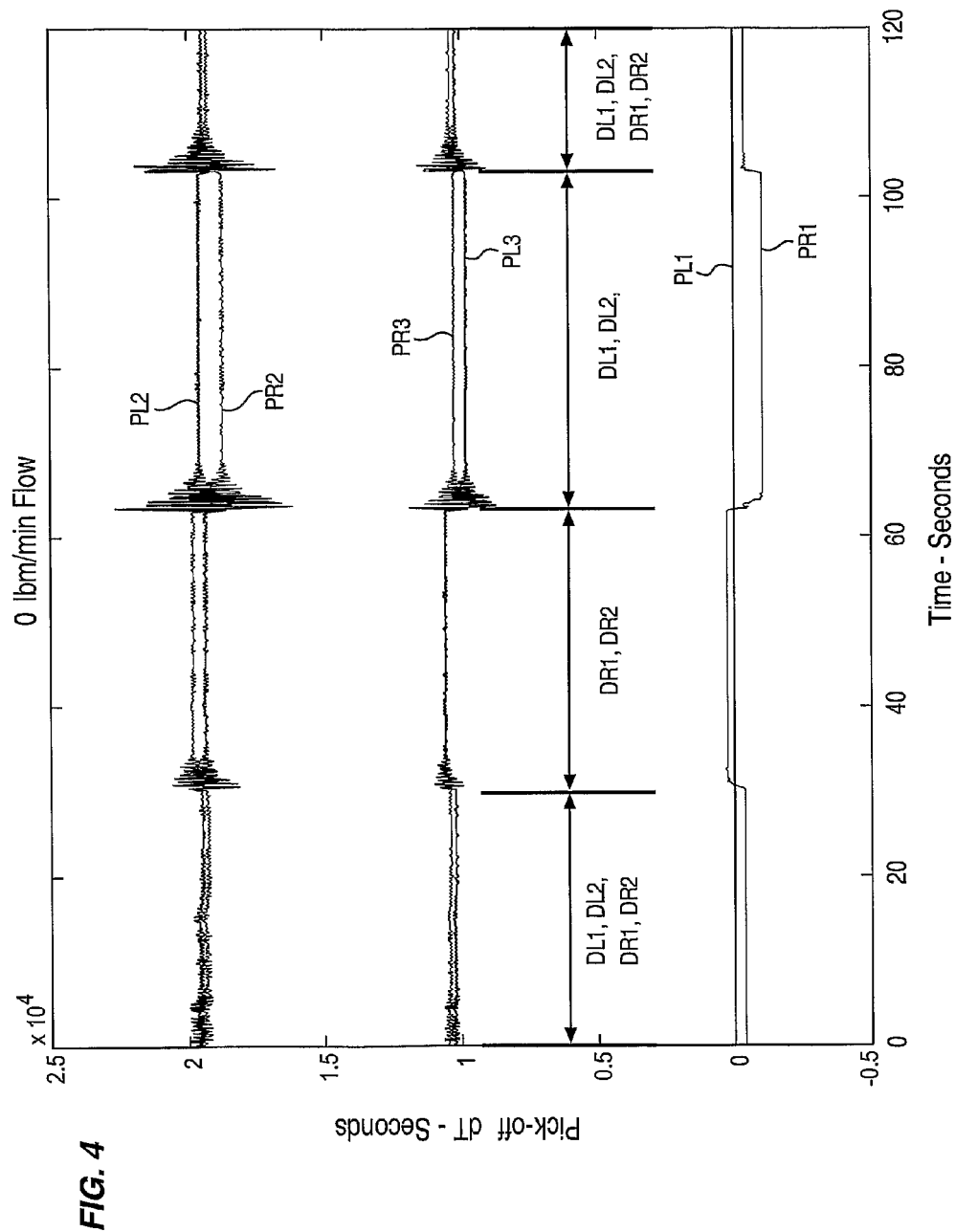
FIG. 4 is a chart showing the relative ΔTs measured using an unbalanced, single tube flow meter while switching between drivers in an example embodiment of the invention.

FIG. 4 is a chart showing the relative $\Delta T$ values measured using an unbalanced, single tube flow meter while switching between drivers in an example embodiment of the invention. On this meter, drivers DR1 and DR2 are oriented at 45 degrees from vertical and are located at the same axial position as sensor PR3. By driving DR1 and DR2 with the same signal a pseudo-collocated driver/sensor pair is achieved. The same relationship was utilized to obtain a pseudo-collocated driver/sensor pair using drivers DL1 and DL2 and sensor PL3. The two driver sensor pairs (DR1/DR2 PR3 and DL1/DL2/PL3) were spaced symmetrically around the axial center of the flow meter. At time zero through time 30, both pseudo driver pairs were used to excite the vibration of the flow meter. The step change in $\Delta T$ values at approximately the 30 second point occurs when the DL1/DL2 driver pair is turned off. This $\Delta T$ change is that caused by the residual flexibility response and electromagnetic crosstalk of the DL1/DL2 pseudo driver. At approximately time 65 driver pair DR1/DR2 is switched off and driver pair DL1/DL2 is switched on. At approximately the 100 second mark the DR1/DR2 driver pair is switched back on and both pseudo driver pairs are used to excite the vibration of the flow meter. The change in the measured $\Delta T$ values between times 100 through 120 is that caused by the residual flexibility response and electromagnetic crosstalk of the DR1/DR2 pseudo driver.

For meters where the drivers and sensors are symmetrically located about the axial center of the meter, the residual flexibility and electronic crosstalk associated with each driver are equal and opposite. During normal operation, when both drivers are being used to excite the vibration of the conduit, the effects cancel and generally do not have to be corrected for to accurately measure the delta T of the right eigenvector. The measurements for the left eigenvector and the residual flexibility and electronic crosstalk can be taken at the same time when each driver is briefly switched off.

Compensating for non-uniform phase between different electronic measurement channels is well known in the arts. For example, a known signal may be applied to the input and the phase corruption measured. This procedure can be performed during flow by providing a spare measurement channel that assumes the measurement function of the channel under test, while the test is being conducted.

Once the relative $\Delta T$ for the left and right eigenvectors are measured and corrected for residual flexibility, electronic crosstalk effects, and the like, the contribution from flow and from non-proportional damping are calculated. The flow effect F is the difference between the relative $\Delta T$ of the left and right eigenvectors divided by 2. $F=(\Delta T_R-\Delta T_L)/2$. A new zero offset can be calculated by comparing the flow effect F with the flow determined by measuring the $\Delta T_R$ during normal operations. ZeroOffset=$\Delta T_R$−F. The new ZeroOffset can be used to correct the measured flow during normal operations until the next time the value for the left eigenvector is determined.

The non-proportional damping effect ND is the average of the left and right eigenvectors ND=$(\Delta T_R+\Delta T_L)/2$. This value could also be used as the new ZeroOffset value.

Figure 5:
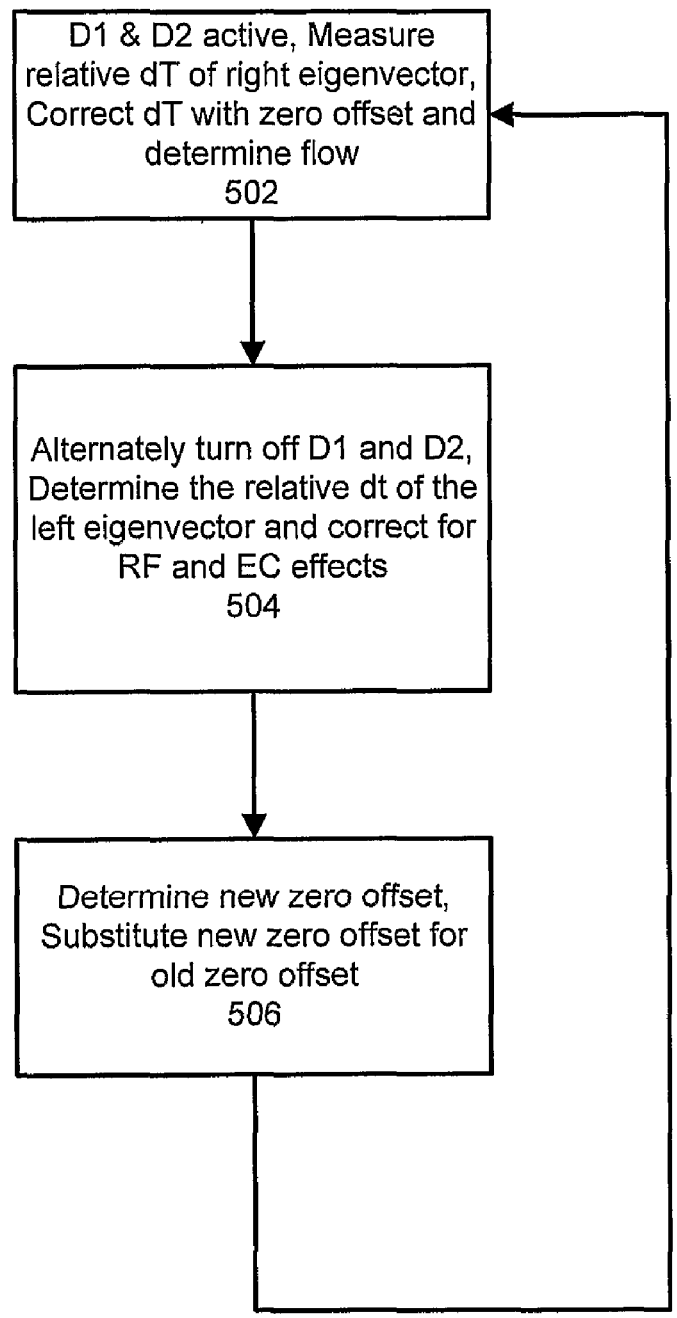
FIG. 5 is a flow chart for recalibrating the zero offset of a flow meter during flow in an example embodiment of the invention.

FIG. 5 is a flow chart for recalibrating the zero offset of a flow meter during flow in one example embodiment of the current invention. In step 502, during normal operations, both drivers are used to excite the vibration of the conduit. An uncorrected relative delta T for the right eigenvector is determined. The uncorrected relative delta T of the right eigenvector is then corrected by using a zero offset. The flow through the meter is determined using the corrected relative delta T of the right eigenvector. Periodically, in step 504, the drivers D1 and D2 are alternately switched off and the relative delta T of the left eigenvector and the residual flexibility (RF) and electronic crosstalk (EC) are determined. The relative delta T of the left eigenvector is corrected for the residual flexibility and electronic crosstalk effects. In step 506 the corrected relative delta T of the left eigenvector and the uncorrected delta T of the right eigenvector are used to determine a new zero offset. The new zero offset is substituted for the old zero offset and the process resumes at step 502. By calculating and substituting the new zero offset into the meter, the meter has been recalibrated for the zero flow condition during material flow through the meter.

In one example embodiment, the determination for when the re-calibration should occur may be done by using a fixed time interval between calibrations. In another example embodiment, a re-calibration may be done when changes in the environment or the piping system are detected. For example, when a change in temperature is greater than a threshold amount, a re-calibration may be performed. The determination for when re-calibration occurs may be a combination of a periodic timer and detecting changes in environment. The time period between recalibrations may be shorter for systems that require higher accuracy than for systems than have less stringent accuracy requirements.

Switching between drivers D1 and D2 in order to measure the relative phase of the left eigenvector does not imply that the normal operation of the flow meter has to be interrupted (i.e. measuring flow using $\Delta T$ of the right eigenvector). For example, when the drivers are placed symmetrically about the centerline of the conduit, each driver excites the drive mode by the same amount. By, for instance, doubling the current to D2 when D1 is inactivated, the magnitude of the driving force can be maintained.

In the descriptions above, the invention was described using a single conduit flow meter. As well understood in the art, the current invention may be used in flow meters of other configurations, for example, dual conduit flow meters. The invention was also described using a straight conduit, but other configurations for the geometry of the flow meter are possible, for example a bent conduit.

We claim:

1. A method, comprising:
   flowing a material through a conduit while exciting a vibration mode of the conduit using at least two drivers in a spaced apart configuration;
   measuring a relative motion of the vibrating conduit;
   determining a first positional relationship between a first location on the conduit and a first one of the drivers while driving the vibration mode of the conduit using only the first one of the drivers (204);
   determining a second positional relationship between the first location on the conduit and a second one of the drivers while driving the vibration mode of the conduit using only the second one of the drivers 206; and
   determining a left eigenvector using the first positional relationship and the second positional relationship (208).

2. The method of claim 1, further comprising:
   determining a relative phase of a right eigenvector for the conduit (302);
   determining an actual flow of the material through the conduit using the relative phase of the left eigenvector and the relative phase of the right eigenvector.

3. The method of claim 2 further comprising:
   determining an uncorrected flow of the material through the conduit using the relative phase of the right eigenvector;
   determining a zero offset for the flow of the material through the conduit by comparing the uncorrected flow with the actual flow (506).

4. The method of claim 3 further comprising:
   determining a material flow through the conduit using the relative phase of the right eigenvector corrected by the zero offset (502).

5. The method of claim 1, further comprising:
   determining the relative phase of a right eigenvector;
   determining a zero offset for the flow of the material through the conduit by averaging the relative phase of the right eigenvector with the relative phase of the left eigenvector.

6. The method of claim 5 further comprising:
   determining a material flow through the conduit using the relative phase of the right eigenvector corrected by the zero offset.

7. The method of claim 1 where the relative phase of the left eigenvector is corrected for a residual flexibility response and electromagnetic cross-talk.

8. The method of claim 7 further comprising:
   measuring a first relative phase between two spaced apart locations on the vibrating conduit while exciting the vibration mode of the conduit using both the first one of the drivers (304) and the second one of the drivers;
   measuring a second relative phase between the two spaced apart locations on the vibrating conduit while exciting the vibration mode of the conduit using only the second one of the drivers (304);
   calculating the residual flexibility response and electromagnetic cross-talk associated with the first one of the drivers by subtracting the second relative phase from the first relative phase (308)
   measuring a third relative phase between the two spaced apart locations on the vibrating conduit while exciting the vibration mode of the conduit using only the first one of the drivers (306);
   calculating the residual flexibility response and electromagnetic cross-talk associated with the second one of the drivers by subtracting the third relative phase from the first relative phase (308).

9. The method of claim 1 where the motion of the conduit is measured with a first sensor that is co-located with the first one of the drivers and with a second sensor that is co-located with the second one of the drivers.

10. The method of claim 1 further comprising:
    measuring a first delta time between the first location and a second location when driving the vibration mode using the at least two drivers (302);
    measuring a second delta time between the first location and the second location when driving the vibration mode using all but the first one of the drivers (304);
    measuring a third delta time between the first location and the second location when driving the vibration mode using all but the second one of the drivers (306);
    calculating a first correction value using the first delta time and the second delta time (308);
    calculating a second correction value using the first delta time and the third delta time (308);
    adjusting the first positional relationship, using the first correction value, before calculating the left eigenvector; and
    adjusting the second positional relationship, using the second correction value, before calculating the left eigenvector.

11. A method, comprising:
    flowing a material through a conduit while exciting a vibration mode of the conduit;
    measuring a relative motion of the vibrating conduit;
    measuring a relative phase of a right eigenvector while exciting the vibration mode of the conduit;
    determining a material flow through the conduit using the relative phase of a right eigenvector corrected by a zero offset (502);
    determining a new zero offset without stopping the material flow through the conduit;

determining the material flow through the conduit using the relative phase of a right eigenvector corrected by the new zero offset.

12. The method of claim 11 where the new zero offset is determined using a relative phase of a left eigenvector for the conduit.

13. The method of claim 11 where the new zero offset is determined periodically.

14. The method of claim 13 where the periodicity is a function of the accuracy required in measuring the flow.

15. The method of claim 11 where the new zero offset is determined when a change in a measured environmental parameter occurs.

16. An apparatus, comprising:
a conduit (102) configured to contain a material flowing through the conduit;
at least two drivers (D1, D2) configured to excite a plurality of vibration modes of the conduit;
a sensing apparatus configured to measure a relative motion of the vibrating conduit;
a device configured to periodically determining a relative phase of a left eigenvector for the conduit using the relative motion of the vibrating conduit;
the device also configured to determine a relative phase of a right eigenvector for the conduit using the relative motion of the vibrating conduit.

17. The apparatus of claim 16 where an actual flow of the material through the conduit is determined by using a difference in the relative phase of the left eigenvector compared to the relative phase of the right eigenvector.

18. The apparatus of claim 16 where a flow of the material through the conduit is determined using the relative phase of the right eigenvector corrected with a zero offset.

19. The apparatus of claim 18, further comprising:
determining the zero offset for the flow of the material through the conduit by averaging the relative phase of the right eigenvector with the relative phase of the left eigenvector.

20. The apparatus of claim 18 where an actual flow of the material through the conduit is determined by subtracting the relative phase of the left eigenvector from the relative phase of the right eigenvector; and, the zero offset for the flow of the material through the conduit is determined by comparing the flow determined using the relative phase of the right eigenvector with the actual flow.

21. The apparatus of claim 16 where the relative phase of the left eigenvector is corrected for a residual flexibility response and electromagnetic cross-talk.

22. The apparatus of claim 21 where a first relative phase between a first location on the vibrating conduit and a second location on the vibrating conduit is determined while exciting the vibration mode of the conduit using the at least two drivers;
a second relative phase between the first location on the vibrating conduit and the second location on the vibrating conduit is determined while exciting the vibration mode of the conduit using all but a first of the at least two drivers;
a third relative phase between the first location on the vibrating conduit and the second location on the vibrating conduit is determined while exciting the vibration mode of the conduit using all but a second of the at least two drivers; and
the residual flexibility response and electromagnetic cross-talk for the first of the at least two drivers is determined by subtracting the second relative phase from the first relative phase;
the residual flexibility response and electromagnetic cross-talk for the second of the at least two drivers is determined by subtracting the third relative phase from the first relative phase.

23. The apparatus of claim 16 where the sensing apparatus comprises at least two sensors in a spaced apart relationship.

24. The apparatus of claim 16 where the device is a processor running code that causes the determination of the relative phase of the left and right eigenvector.

25. The apparatus of claim 16 where the device is a circuit that causes the determination of the relative phase of the left and right eigenvector.

* * * * *

UNITED STATES PATENT AND TRADEMARK OFFICE
CERTIFICATE OF CORRECTION

PATENT NO.       : 7,706,987 B2
APPLICATION NO.  : 11/574716
DATED            : April 27, 2010
INVENTOR(S)      : Thomas Dean Sharp et al.

It is certified that error appears in the above-identified patent and that said Letters Patent is hereby corrected as shown below:

Column 8, line 47, replace "S2" with --$\theta S2$--; line 50, replace "frequency to $\omega$. $\Delta T = (\theta S1 - \theta S2)/\omega to$" with --frequency $\omega$. $\Delta T = (\theta S1 - \theta S2)/\omega$--

Column 9, lines 44 and 46, each occurrence of "$\Delta TD_2$" should read --$\Delta T_{D2}$--

Signed and Sealed this
Twenty-second Day of February, 2011

David J. Kappos
*Director of the United States Patent and Trademark Office*